United States Patent
Wang

(10) Patent No.: US 8,867,151 B2
(45) Date of Patent: Oct. 21, 2014

(54) VOICE COIL MOTOR AND CAMERA MODULE USING THE SAME

(75) Inventor: Yu-Bin Wang, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 196 days.

(21) Appl. No.: 13/304,313

(22) Filed: Nov. 24, 2011

(65) Prior Publication Data

US 2013/0010378 A1 Jan. 10, 2013

(30) Foreign Application Priority Data

Jul. 8, 2011 (TW) .............................. 100124135 A

(51) Int. Cl.
G02B 7/02 (2006.01)
H02K 41/02 (2006.01)
H02K 41/035 (2006.01)
G02B 7/08 (2006.01)

(52) U.S. Cl.
CPC .............. *H02K 41/0356* (2013.01); *G02B 7/08* (2013.01)
USPC ........ 359/824; 359/814; 359/823; 310/12.04; 310/12.16; 310/12.31

(58) Field of Classification Search
CPC .............. G02B 7/00; G02B 7/02; G02B 7/04; G02B 7/10; H02K 41/035; H02K 41/0354; H02K 41/0356; H04N 5/2254; H04N 5/2257

USPC ......... 359/811, 814, 824, 826, 554, 556, 823; 310/12.04, 12.16, 12.31, 14; 396/55, 396/133, 529, 535, 554, 144; 348/208.4, 348/208.7, 208.11, 208.99, 374, 375, 335, 348/E5.024

See application file for complete search history.

(56) References Cited

U.S. PATENT DOCUMENTS

| 7,944,631 | B2 * | 5/2011 | Sata et al. ..................... 359/819 |
| 8,194,336 | B2 * | 6/2012 | Kimoto ......................... 359/824 |
| 8,503,121 | B2 * | 8/2013 | Osaka et al. .................. 359/824 |
| 8,531,534 | B2 * | 9/2013 | Hu et al. .................. 348/208.11 |
| 8,537,226 | B2 * | 9/2013 | Ke ............................. 348/208.7 |

* cited by examiner

*Primary Examiner* — Loha Ben
(74) *Attorney, Agent, or Firm* — Novak Druce Connolly Bove + Quigg LLP

(57) ABSTRACT

A voice coil motor for driving a lens group includes a housing, a first cover, a second cover, a movable member, and a plurality of magnets. The housing is a hollow and includes a top plate and four sidewalls protruding from the top plate. The movable member is movably received in a space defined by the housing and the first and second covers, and includes a barrel for receiving and being connected to the lens group, and a coil arranged around the barrel. The magnets are arranged between the housing and the movable member, stayed in contact with the sidewalls, and drive the movable member and the lens group to move in the housing when a current is supplied to the coil.

14 Claims, 4 Drawing Sheets

VOICE COIL MOTOR AND CAMERA MODULE USING THE SAME

BACKGROUND

1. Technical Field

The present disclosure relates to motors and, particularly, to a voice coil motor and a camera module using the voice coil motor.

2. Description of Related Art

Voice coil motors are used in some camera modules for moving lens(es). A voice coil motor may include a variety of magnets, a housing for receiving the lens group and the magnets, and a first and second covers secured to the top and bottom of the housing. Each of the first and second covers may include fixing posts protruding from the corners of the first and second covers to surround the housing. With the above configuration, the housing needs to define four chamfers at the corners to accommodate the fixing posts.

However, the chamfers take up part of the space in which the magnetic members are received, so the size of the magnets needs to be decreased to adapt to the housing, which decreases the magnetic force generated by the magnets.

Therefore, what is needed is a voice coil motor and a camera module to solve the problems described above.

DETAILED DESCRIPTION

Figure 1:
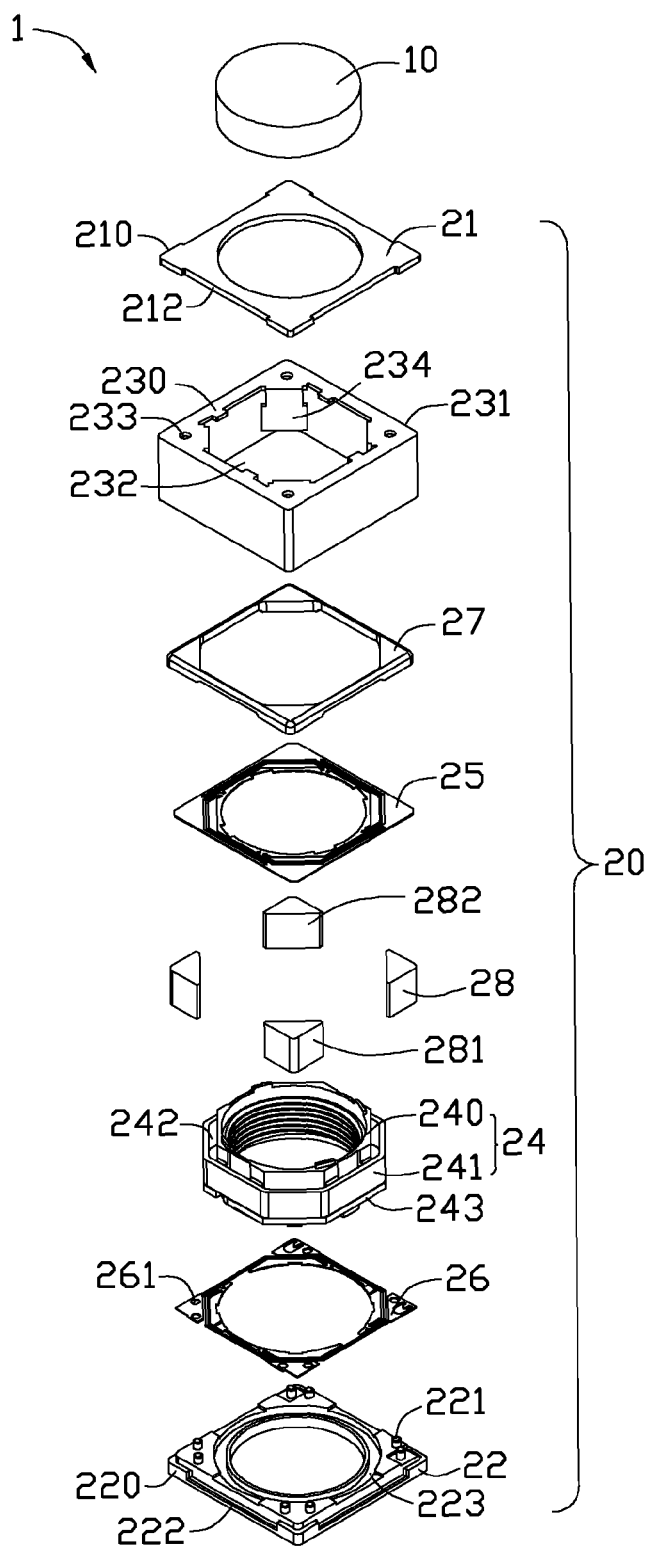
FIG. 1 is an exploded, isometric view of a camera module, in accordance with an embodiment.
Figure 2:
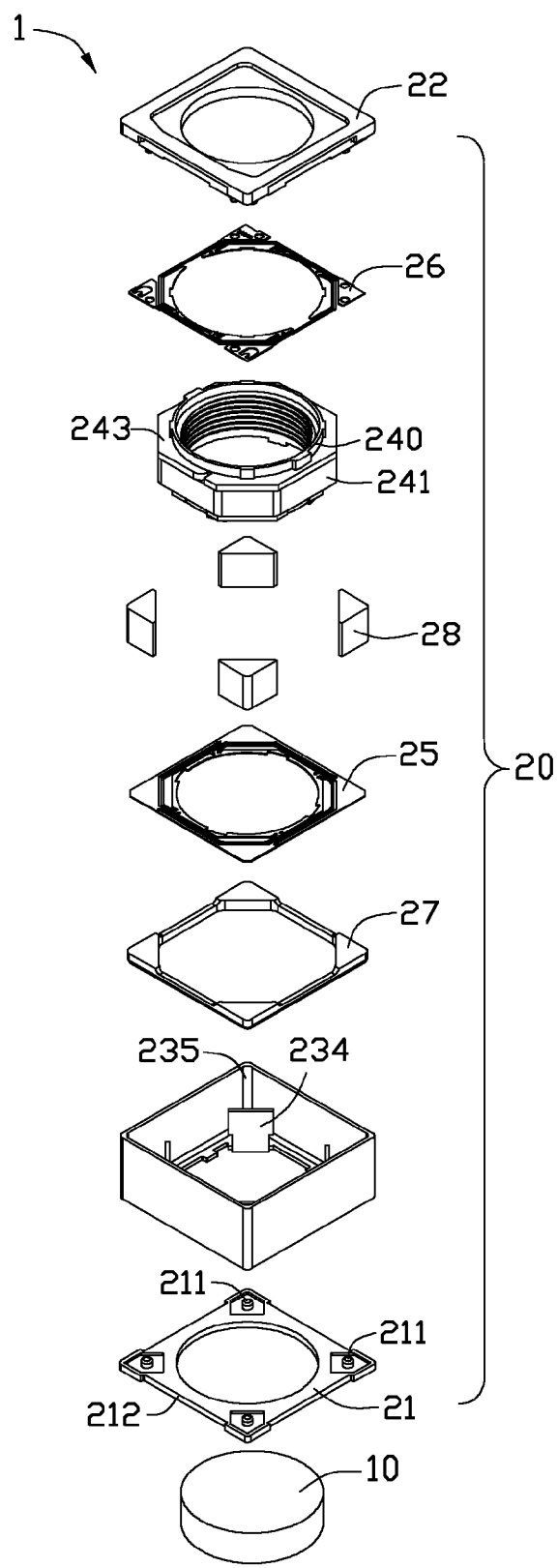
FIG. 2 is similar to FIG. 1, but showing the camera module from another perspective.
Figure 3:
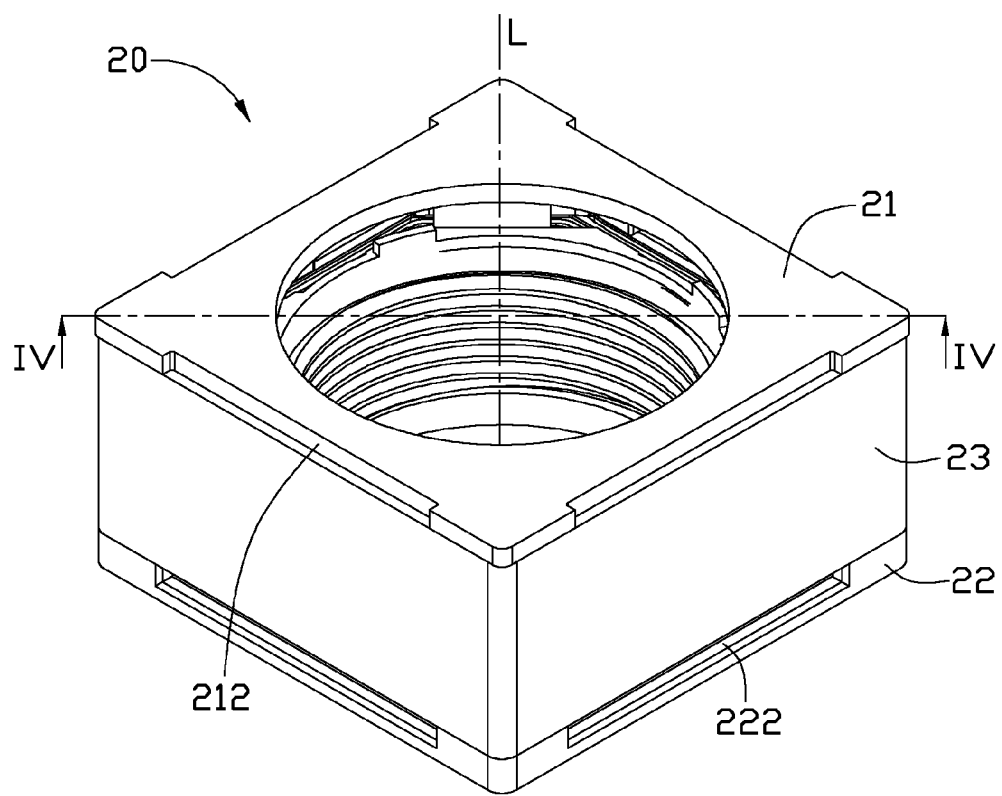
FIG. 3 is an isometric view of a voice coil motor used in the camera module of FIG. 1, in accordance with an embodiment.

Referring to FIGS. 1-4, an exemplary embodiment of a camera module 1 is illustrated. The camera module 1 includes a voice coil motor 20 and a lens group 10 mounted in the voice motor 20 and moved by the voice coil motor 20.

The voice coil motor 20 includes a first cover 21, a second cover 22, a housing 23, a movable member 24, a first elastic member 25, a second elastic member 26, and a spacer 27. Each of the housing 23 and the movable member 24 includes an imaginary axis which is coaxial with optical axis L of the lens group 10. In an alternative embodiment, the spacer 27 may be omitted.

The housing 23 is sandwiched between the first and second covers 21, 22. The housing 23, and the first and second covers 21, 22 cooperatively form a space for receiving the movable member 24, the first elastic member 25, the second elastic member 26, and the spacer 27. The first elastic member 25 is secured to the top of the movable member 24. The second elastic member 26 is secured to the bottom of the movable member 24. The spacer 27 is located between the first cover 21 and the first elastic member 25.

The first cover 21 includes four edges 210, each of which defines a first elongated cut 212. Four first protrusions 211 protrude from the bottom of the first cover 21.

The housing 23 is a substantially hollow cuboid, and includes a top plate 230 and four sidewalls 231 protruding from the top plate 230. The sidewalls 231 are connected to each other to form four interior corners 235. The top plate 230 defines an aperture 232 in the center and four first fixing holes 233 surrounding the aperture 232. Each of the first protrusions 211 is inserted into one of the first fixing holes 233 which positions the first cover 21 with respect to the housing 23. The first elongated cuts 212 receive adhesive material used to glue the first cover 21 to the housing 23.

Four tabs 234 extend inwardly from the rim of the aperture 232 into the space defined by the first and second covers 21, 22 and the housing 23. Four magnets 28, triangular in cross section, are attached to the inner side of the sidewalls 231. In the embodiment, each of the magnets 28 includes a first side and second sides 281 enabling each of the magnets 28 to be adhesively fixed into one of the interior corners 235 of the housing 23, and a third side 282 facing one of the tabs 234.

Figure 4:
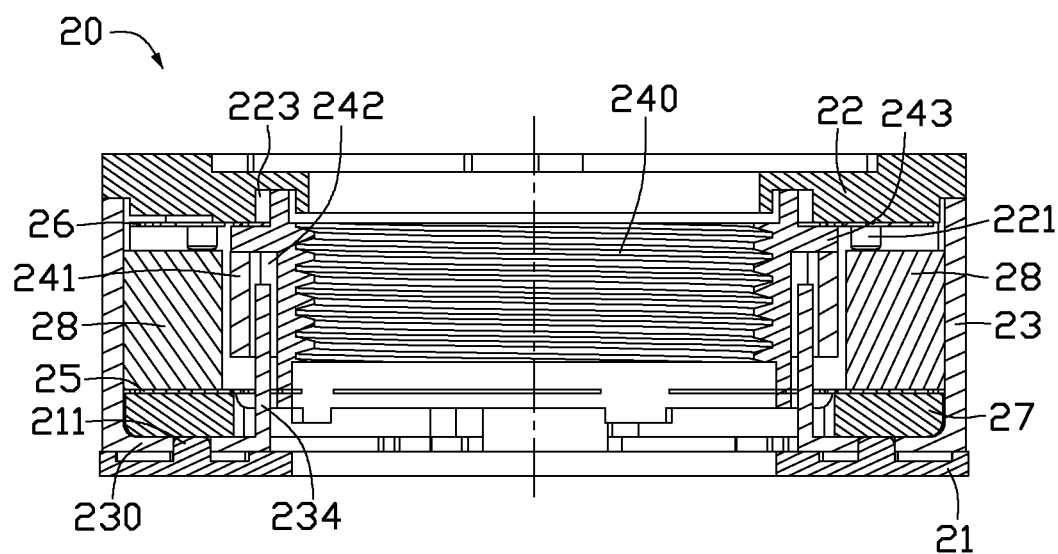
FIG. 4 is a cross-sectional view taken along line IV-IV of FIG. 3.

The movable member 24 is surrounded by the four magnets 28. The movable member 24 includes a barrel 240, a flange 243 around the periphery of the barrel 240, and a coil 241 fixed to the flange 243 and arranged around and spaced from the barrel 240. In the embodiment, the height of the coil 241 is less than that of the barrel 240. The coil 241 and the barrel 240 cooperatively form an annular space 242 for receiving the tabs 234. As shown in FIG. 4, the coil 241 is located between the magnets 28 and the tabs 234. In this case, any lateral movement of the movable member 24 is limited by the tabs 234.

The magnets 28 provide a first magnetic field to the movable member 24. When energized, the coil 241 of the movable member 24 generates a second magnetic field. As a result, electromagnetism forces the movable member 24 and the lens group 10 received in the movable member 24 to move backwards and forwards along the optical axis L.

The first and second elastic members 25, 26 are respectively glued to the top and bottom of the movable member 24. When the movable member 24 is driven by the magnets 28 to move along the optical axis L, the first and second elastic members 25, 26 serve to limit the forward and backward movement of the movable member 24, and as resilient elements to return the movable member 24 to its original position when the coil is not energized.

In the embodiment, the spacer 27 is arranged between the top plate 230 of the housing 23 and the first elastic member 25. Each of the first protrusions 211 is inserted into a first fixing hole 233 and abuts against the spacer 27. The first elastic member 25 is held between the spacer 27 and the magnets 28.

The structure of the second elastic member 26 is similar to that of the first elastic member 25. The second elastic member 26 defines four second fixing holes 261.

The second cover 22 includes four second edges 220 and defines an annular groove 223 in its inner side to accommodate the bottom of the barrel 240. Each of the second edges 220 defines a second elongated cut 222. The second cover 22 further includes four second protrusions 221 protruding from its inner side. The second protrusions 221 engage with the second fixing holes 261 to position the second cover 22 to the housing 23, and the second elongated cuts 222 receive adhesive material used to glue the second cover 22 to the housing 23.

Lacking chamfers at its corners, the housing 23 can accommodate magnets of greater size without increasing its own size, thereby allowing the creation of a stronger first magnetic field. Furthermore, the disposition of the four magnets 28 allows the creation of a larger space to accommodate the movable member 24. Therefore, the size or depth of the coil 241 of the movable member 24 can be increased to provide a stronger second magnetic field when a current is supplied to the coil 241.

Although the present disclosure has been specifically described on the basis of the exemplary embodiment thereof, the disclosure is not to be construed as being limited thereto. Various changes or modifications may be made to the embodiment without departing from the scope and spirit of the disclosure.

What is claimed is:

1. A voice coil motor for driving a lens group, comprising:
   a hollow housing comprising a top plate and four sidewalls protruding from the top plate, the top plate defining an aperture in a center and a plurality of first fixing holes surrounding the aperture, the sidewalls being connected to each other to form four interior corners;
   a first cover secured to the top plate of the housing, and comprising a plurality of first protrusions correspondingly inserted into the first fixing holes to position the first cover with respect to the housing;
   a second cover secured to bottoms of the sidewalls;
   a movable member movably received in a space defined by the housing and the first and second covers, and comprising a barrel for receiving and being connected to the lens group, and a coil arranged around the barrel, wherein a plurality of tabs extend from a rim of the aperture into the space, and are configured to limit a lateral movement of the movable member in the housing; and
   a plurality of magnets arranged between the housing and the movable member and stayed in contact with the sidewalls, wherein the magnets drive the movable member and the lens group to move in the housing when a current is supplied to the coil, each of the magnets has a triangular cross-section and comprises a first side, a second side and a third side, the first and second sides enabling each of the magnets to be adhesively fixed into one of the interior corners, and the third side facing one of the tabs.

2. The voice coil motor as claimed in claim 1, wherein the first cover further comprises four first edges surrounding the first protrusions, and each of the first edges defines a first elongated cut to receive adhesive material to glue the first cover to the housing.

3. The voice coil motor as claimed in claim 2, further comprising a first elastic member and a second elastic member, wherein the first and second elastic members are respectively secured to a top and bottom of the movable member and serve to limit the movable member when the movable member moves in the housing and as resilient elements to return the movable member to its original position when the coil is not energized.

4. The voice coil motor as claimed in claim 3, further comprising a spacer, wherein the spacer is arranged between the top plate and the first elastic member, each of the first protrusions inserted into the corresponding first fixing hole abuts against the spacer, and the first elastic member is held between the spacer and the magnets.

5. The voice coil motor as claimed in claim 3, wherein the second elastic member defines four second fixing holes, the second cover comprises four second protrusions correspondingly inserted into the second fixing holes to position the second elastic member with respect to the second cover, and the second elastic member is held between the second cover and the magnets.

6. The voice coil motor as claimed in claim 5, wherein the second cover further comprises four second edges surrounding the second protrusions, and each of which defines a second elongated cut to receive adhesive material used to glue the second cover to the housing.

7. A voice coil motor for driving a lens group, comprising:
   a hollow housing comprising a top plate and four sidewalls protruding from the top plate, the sidewalls being connected to each other to form four interior corners;
   a first cover secured to the top plate of the housing;
   a second cover secured to bottoms of the sidewalls;
   a movable member movably received in a space defined by the housing and the first and second covers, and comprising a barrel for receiving and being connected to the lens group, and a coil arranged around the barrel, wherein the second cover defines a groove to accommodate a bottom of the barrel; and
   a plurality of magnets arranged between the housing and the movable member and stayed in contact with the sidewalls, wherein the magnets drive the movable member and the lens group to move in the housing when a current is supplied to the coil, each of the magnets has a triangular cross-section and comprises a first side, a second side and a third side, the first and second sides enabling each of the magnets to be adhesively fixed into one of the interior corners, and the third side facing one of the tabs.

8. The voice coil motor as claimed in claim 7, wherein the movable member further comprises a flange around the periphery of the barrel, and the coil is fixed to the flange.

9. A camera module comprising:
   a lens group; and
   a voice coil motor receiving the lens group, comprising:
      a substantially cuboid housing comprising a top plate and four sidewalls protruding from the top plate, the sidewalls being connected to each other to form four interior corners, and the top plate defining an aperture in a center and a plurality of first fixing holes surrounding the aperture;
      a first cover secured to the top plate of the housing, and comprising a plurality of first protrusions correspondingly inserted into the first fixing holes to position the first cover with respect to the housing;
      a second cover secured to bottoms of the sidewalls;
      a movable member movably received in a space defined by the housing and the first and second covers, and comprising a barrel receiving and connected to the lens group, and a coil arranged around the barrel, wherein a plurality of tabs extend from a rim of the aperture into the space, and are configured to limit a lateral movement of the movable member in the housing; and
      a plurality of magnets arranged between the housing and the movable member and stayed in contact with the sidewalls, wherein the magnets drive the movable member and the lens group to move in the housing when a current is supplied to the coil, each of the magnets has a triangular cross-section and comprises a first side, a second side and a third side, the first and second sides enabling each of the magnets to be adhesively fixed into one of the interior corners, and the third side facing one of the tabs.

10. The camera module as claimed in claim 9, wherein the first cover further comprises four first edges surrounding the first protrusions, and each of the first edges defines a first elongated cut to receive adhesive material to glue the first cover to the housing.

11. The camera module as claimed in claim 10, further comprising a first elastic member and a second elastic member, wherein the first and second elastic members are respectively secured to a top and bottom of the movable member to serve to limit the movable member when the movable member moves in the housing and as resilient elements to return the movable member to its original position when the movable member moves in the housing when the coil is not energized.

12. The camera module as claimed in claim 11, further comprising a spacer, wherein the spacer is arranged between the top plate and the first elastic member, each of the first protrusions inserted into the corresponding first fixing hole abuts against the spacer, and the first elastic member is held between the spacer and the magnets.

13. The camera module as claimed in claim 11, wherein the second elastic member defines four second fixing holes, the second cover comprises four second protrusions correspondingly inserted into the second fixing holes to position the second elastic member with respect to the second cover, and the second elastic member is held between the second cover and the magnets.

14. The camera module as claimed in claim 13, wherein the second cover further comprises four second edges surrounding the second protrusions, and each of which defines a second elongated cut to receive adhesive material used to glue the second cover to the housing.

\* \* \* \* \*